(12) United States Patent
Kikuchi et al.

(10) Patent No.: US 8,242,620 B2
(45) Date of Patent: Aug. 14, 2012

(54) WIND TURBINE GENERATOR SYSTEM

(75) Inventors: Akira Kikuchi, Hitachi (JP); Masaya Ichinose, Hitachiota (JP); Motoo Futami, Hitachiota (JP); Mitsugu Matsutake, Hitachi (JP); Kouichi Miyazaki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/117,961

(22) Filed: May 27, 2011

(65) Prior Publication Data
US 2011/0266799 A1    Nov. 3, 2011

Related U.S. Application Data

(63) Continuation of application No. 12/582,199, filed on Oct. 20, 2009, now Pat. No. 7,952,216, which is a continuation of application No. 11/774,868, filed on Jul. 9, 2007, now Pat. No. 7,615,880, which is a continuation of application No. 11/196,250, filed on Aug. 4, 2005, now Pat. No. 7,268,443.

(30) Foreign Application Priority Data

Aug. 6, 2004 (JP) ................................ 2004-230058

(51) Int. Cl.
  *F03D 9/00* (2006.01)
  *H02P 9/04* (2006.01)
  *F02D 29/06* (2006.01)
(52) U.S. Cl. ...................................... 290/44; 290/40 C
(58) Field of Classification Search ................ 290/40 C, 290/44
See application file for complete search history.

(56) References Cited

U.S. PATENT DOCUMENTS

| | | | |
|---|---|---|---|
| 1,914,095 A | 6/1933 | Ashbaugh | 307/80 |
| 2,063,077 A | 12/1936 | Bany et al. | 307/87 |
| 3,242,417 A | 3/1966 | Bertschi | 322/25 |
| 4,388,585 A | 6/1983 | Nola | 322/47 |
| 4,400,659 A | 8/1983 | Barron et al. | 322/32 |
| 4,525,633 A | 6/1985 | Wertheim et al. | 290/44 |
| 4,541,052 A * | 9/1985 | McCulloch | 701/110 |
| 4,656,413 A | 4/1987 | Bourbeau | 322/47 |
| 4,695,736 A | 9/1987 | Doman et al. | 290/44 |
| 4,700,081 A | 10/1987 | Kos et al. | 290/44 |
| 4,708,594 A | 11/1987 | Shinmei et al. | 417/53 |
| 4,710,686 A | 12/1987 | Guzik | 318/293 |
| 4,754,156 A * | 6/1988 | Shiozaki et al. | 290/52 |

(Continued)

FOREIGN PATENT DOCUMENTS

JP    2002-233193    8/2002

(Continued)

*Primary Examiner* — Pedro J Cuevas
(74) *Attorney, Agent, or Firm* — Antonelli, Terry, Stout & Kraus, LLP.

(57) ABSTRACT

A wind turbine generator system can regulate the rotational velocity of the wind turbine within an operation range even when the wind velocity suddenly changes and can perform continuous operation of the wind turbine. The wind turbine generator system includes a generator connected to the shaft of the wind turbine and a converter connected to the generator. When the rotational velocity of the wind turbine is within a predetermined range, power outputted from the generator is controlled so as to follow the instruction concerning the generator output given from the wind turbine to the converter. When the rotational velocity of the wind turbine is out of the predetermined range, the power outputted from the generator is controlled without following the instruction concerning generator output given from the wind turbine to the converter.

13 Claims, 8 Drawing Sheets

U.S. PATENT DOCUMENTS

| | | | | |
|---|---|---|---|---|
| 4,816,696 | A | 3/1989 | Sakayori et al. | 290/52 |
| 4,823,018 | A | 4/1989 | Kuwabara et al. | 290/7 |
| 4,920,277 | A * | 4/1990 | Kuwabara et al. | 290/40 C |
| 4,994,684 | A | 2/1991 | Lauw et al. | 290/52 |
| 5,028,804 | A | 7/1991 | Lauw | 290/40 C |
| 5,155,375 | A | 10/1992 | Holley | 290/44 |
| 5,160,244 | A | 11/1992 | Kuwabara et al. | 417/36 |
| 5,255,712 | A | 10/1993 | Foster | 137/522 |
| 5,289,041 | A | 2/1994 | Holley | 290/44 |
| 5,391,926 | A | 2/1995 | Staley et al. | 290/55 |
| 5,418,446 | A | 5/1995 | Hallidy | 322/28 |
| 5,663,631 | A | 9/1997 | Kajiura et al. | 322/29 |
| 5,757,641 | A | 5/1998 | Minto | 700/4 |
| 6,137,187 | A | 10/2000 | Mikhail et al. | 290/44 |
| 6,420,795 | B1 | 7/2002 | Mikhail et al. | 290/44 |
| 6,566,764 | B2 | 5/2003 | Rebsdorf et al. | 290/44 |
| 6,703,718 | B2 | 3/2004 | Calley et al. | 290/44 |
| 6,731,522 | B2 * | 5/2004 | Kawazoe et al. | 363/37 |
| 6,768,277 | B2 * | 7/2004 | Ichinose et al. | 318/140 |
| 6,834,502 | B2 * | 12/2004 | Ichinose et al. | 60/660 |
| 6,847,128 | B2 | 1/2005 | Mikhail et al. | 290/44 |
| 6,856,038 | B2 | 2/2005 | Rebsdorf et al. | 290/44 |
| 6,856,039 | B2 | 2/2005 | Mikhail et al. | 290/44 |
| 6,856,040 | B2 | 2/2005 | Feddersen et al. | 290/44 |
| 6,933,625 | B2 | 8/2005 | Feddersen et al. | 290/44 |
| 6,940,185 | B2 | 9/2005 | Andersen et al. | 290/44 |
| 6,954,004 | B2 | 10/2005 | Skeist et al. | 290/44 |
| 7,015,595 | B2 | 3/2006 | Feddersen et al. | 290/44 |
| 7,042,110 | B2 | 5/2006 | Mikhail et al. | 290/44 |
| 7,068,015 | B1 | 6/2006 | Feddersen | 322/89 |
| 7,095,131 | B2 | 8/2006 | Mikhail et al. | 290/44 |
| 7,095,132 | B2 | 8/2006 | Kikuchi et al. | 290/52 |
| 7,145,262 | B2 | 12/2006 | Kikuchi et al. | 290/44 |
| 7,268,443 | B2 | 9/2007 | Kikuchi et al. | 290/44 |
| 7,304,400 | B2 | 12/2007 | Kang et al. | 290/44 |
| 7,315,091 | B2 * | 1/2008 | Obayashi et al. | 290/40 C |
| 7,330,014 | B2 * | 2/2008 | Obayashi | 322/24 |
| 7,342,323 | B2 | 3/2008 | Avagliano et al. | 290/55 |
| 7,352,075 | B2 | 4/2008 | Willey et al. | 290/44 |
| 7,352,076 | B1 | 4/2008 | Gabrys | 290/44 |
| 7,411,309 | B2 | 8/2008 | Hudson | 290/44 |
| 7,425,771 | B2 | 9/2008 | Rivas et al. | 290/44 |
| 7,528,496 | B2 | 5/2009 | Fortmann | 290/44 |
| 7,586,205 | B2 | 9/2009 | Krueger | 290/44 |
| 7,595,563 | B2 | 9/2009 | Wobben | 290/44 |
| 7,629,702 | B2 | 12/2009 | Schubert | 290/44 |
| 7,642,666 | B2 * | 1/2010 | Ichinose et al. | 290/44 |
| 7,728,451 | B2 * | 6/2010 | Ichinose et al. | 290/44 |
| 7,800,243 | B2 | 9/2010 | Bendixen et al. | 290/44 |
| 7,830,127 | B2 | 11/2010 | Corcelles Pereira et al. | 322/24 |
| 7,859,125 | B2 | 12/2010 | Nielsen et al. | 290/44 |
| 7,863,766 | B2 | 1/2011 | Abolhassani et al. | 290/44 |
| 7,888,894 | B2 * | 2/2011 | Sugawara et al. | 318/139 |
| 2003/0020419 | A1 * | 1/2003 | Ichinose et al. | 318/140 |
| 2003/0071467 | A1 | 4/2003 | Calley et al. | 290/44 |
| 2003/0209912 | A1 | 11/2003 | Badger | 290/55 |
| 2004/0003595 | A1 * | 1/2004 | Ichinose et al. | 60/698 |
| 2004/0201220 | A1 | 10/2004 | Andersen et al. | 290/44 |
| 2005/0012339 | A1 | 1/2005 | Mikhail et al. | 290/44 |
| 2005/0012487 | A1 | 1/2005 | Skeist et al. | 318/727 |
| 2005/0253396 | A1 | 11/2005 | Mikhail et al. | 290/44 |
| 2006/0028025 | A1 * | 2/2006 | Kikuchi et al. | 290/44 |
| 2007/0052244 | A1 | 3/2007 | Hudson | 290/44 |
| 2007/0075546 | A1 | 4/2007 | Avagliano et al. | 290/44 |
| 2007/0108771 | A1 | 5/2007 | Jones et al. | 290/44 |
| 2007/0121354 | A1 | 5/2007 | Jones et al. | 363/47 |
| 2007/0216164 | A1 | 9/2007 | Rivas et al. | 290/44 |
| 2007/0262583 | A1 | 11/2007 | Kikuchi et al. | 290/44 |
| 2008/0001411 | A1 | 1/2008 | Ichinose et al. | 290/55 |
| 2008/0106099 | A1 | 5/2008 | Ichinose et al. | 290/44 |
| 2008/0143111 | A1 | 6/2008 | Ichinose et al. | 290/44 |
| 2008/0296898 | A1 | 12/2008 | Ichinose et al. | 290/44 |
| 2009/0085354 | A1 | 4/2009 | Tan et al. | 290/44 |
| 2010/0038908 | A1 * | 2/2010 | Kikuchi et al. | 290/44 |
| 2010/0060001 | A1 | 3/2010 | Gabrys | 290/44 |
| 2010/0060002 | A1 | 3/2010 | Gabrys | 290/44 |
| 2010/0066087 | A1 | 3/2010 | Hayashi et al. | 290/44 |
| 2010/0102560 | A1 * | 4/2010 | Ichinose et al. | 290/44 |
| 2010/0109328 | A1 | 5/2010 | Li et al. | 290/44 |
| 2010/0114388 | A1 | 5/2010 | Ooi et al. | 700/287 |
| 2010/0117605 | A1 | 5/2010 | Kretschmann | 322/28 |
| 2010/0133816 | A1 | 6/2010 | Abolhassani et al. | 290/44 |
| 2010/0135789 | A1 | 6/2010 | Zheng et al. | 416/1 |
| 2010/0142237 | A1 | 6/2010 | Yuan et al. | 363/97 |
| 2010/0156192 | A1 | 6/2010 | Wang et al. | 307/82 |
| 2010/0207396 | A1 | 8/2010 | Simon | 290/55 |
| 2010/0219634 | A1 | 9/2010 | Arlaban Gabeiras et al. | 290/44 |
| 2010/0237618 | A1 | 9/2010 | Arinaga et al. | 290/44 |
| 2010/0256829 | A1 | 10/2010 | Sadaba et al. | 700/287 |
| 2010/0270798 | A1 | 10/2010 | Poulsen et al. | 290/44 |
| 2010/0283245 | A1 | 11/2010 | Gjerlov et al. | 290/44 |
| 2010/0283246 | A1 | 11/2010 | Christensen | 290/44 |
| 2010/0314872 | A1 | 12/2010 | Wagoner et al. | 290/44 |
| 2010/0314875 | A1 | 12/2010 | Grant | 290/44 |
| 2010/0327666 | A1 | 12/2010 | Abolhassani et al. | 307/151 |
| 2011/0001318 | A1 | 1/2011 | Nelson | 290/44 |
| 2011/0012352 | A1 | 1/2011 | Nelson et al. | 290/44 |
| 2011/0012364 | A1 | 1/2011 | Abolhassani et al. | 290/55 |
| 2011/0018270 | A1 | 1/2011 | Corcelles Pereira et al. | 290/44 |
| 2011/0187109 | A1 * | 8/2011 | Ichinose et al. | 290/44 |

FOREIGN PATENT DOCUMENTS

| | | |
|---|---|---|
| WO | WO 01/73518 A1 | 10/2001 |

* cited by examiner

WIND TURBINE GENERATOR SYSTEM

CROSS REFERENCE TO RELATED APPLICATION

This application is a Continuation of U.S. application Ser. No. 12/582,199, filed Oct. 20, 2009 now U.S. Pat. No. 7,952,216, which is a Continuation of U.S. application Ser. No. 11/744,868, filed Jul. 9, 2007, now U.S. Pat. No. 7,615,880, which is a Continuation of U.S. application Ser. No. 11/196,250, filed Aug. 4, 2005, now U.S. Pat. No. 7,268,443, which claims priority from Japanese patent application JP 2004-230058, filed on Aug. 6, 2004, the contents of which are incorporated herein by reference.

BACKGROUND OF THE INVENTION

The present invention relates to a wind turbine generator system, and in particular to a wind turbine generator system capable of continuous operation of a wind turbine by maintaining the rotational velocity of the wind turbine.

Explanation will be given on the conventional wind turbine generator system. The wind turbine is connected to a generator. The wind turbine is rotated by wind power and the wind turbine drives the generator, so that the generator generates electricity. When using a synchronous generator as the generator, the stator of the generator is connected to a converter and AC power outputted from the generator is converted into DC power by the converter. Furthermore, the power is converted into AC power of a commercial frequency by an inverter and supplied to a power system. The converter regulates the output of the generator according to a power instruction given from outside. An example of the wind turbine generator system having such a configuration is disclosed in JP-A-2002-233193 (Paragraphs [0029] to [0031]).

The wind turbine generator system is greatly affected by fluctuation of the wind velocity, which makes the rotational velocity of the wind turbine fluctuate. When the rotational velocity of the wind turbine is out of the operation range, the operation is normally stopped so as to protect the wind turbine. Here, conventionally, when the wind velocity fluctuates, the pitch angle of the wind turbine blade is controlled according to the wind velocity or the power instruction given to the converter is adjusted according to the wind velocity, thereby suppressing the wind turbine rotational velocity fluctuation.

However, control of the pitch angle by driving the wind turbine blade according to the wind velocity includes mechanical operation and cannot have a high response. When the power instruction given to the converter is adjusted according to the wind velocity, decision is normally made by the power curve based on the average wind velocity and it is difficult to follow the transient wind velocity change. Accordingly, when the wind velocity changes suddenly and the rotational velocity of the wind turbine deviates from the operation range, the wind turbine may stop. In this case, the wind turbine should be started again.

However, in order to increase the wind turbine generating electrical quantity, it is preferable that the wind turbine continuously operate even when the wind velocity suddenly changes. When the wind turbine generating electrical quantity increases, it is possible to reduce the wind turbine generation cost. Accordingly, it is important to operate the wind turbine continuously and improve the wind turbine use ratio. Moreover, when the wind turbine can be continuously operated, the number of operation times of a contactor or the like for linking the wind turbine with a system is decreased, and hence the service life of these devices can be increased.

SUMMARY OF THE INVENTION

It is therefore an object of the present invention to provide a wind turbine generator system capable of controlling the wind turbine rotational velocity within an operation range even when the wind velocity suddenly changes so that the wind turbine can be continuously operated, thereby improving the wind turbine use ratio.

The present invention provides a wind turbine generator system including a generator connected to a shaft of a wind turbine and a converter connected to the generator. When the rotational velocity of the wind turbine is within a predetermined range, the power outputted from the generator is regulated so as to follow an instruction concerning the generator output given from the wind turbine to the converter. When the rotational velocity of the wind turbine is out of the predetermined range, the power outputted from the generator is regulated without following the instruction concerning the generator output.

According to another aspect of the present invention, the wind turbine generator system is characterized in that when the rotational velocity of the wind turbine is within a predetermined range, the power outputted from the generator is regulated so as to follow a value obtained by multiplying the instruction concerning the generator torque given from the wind turbine to the converter, by the rotational velocity of the wind turbine, and when the rotational velocity of the wind turbine is out of the predetermined range, the power outputted from the generator is regulated without following the value obtained by multiplying the instruction concerning the generator torque given from the wind turbine to the converter, by the rotational velocity of the wind turbine.

According to the present invention, it is possible to regulate the output of the wind turbine according to an instruction given from outside when the rotational velocity of the wind turbine is within a set range and when the rotational velocity of the wind turbine is out of the set range, the velocity is regulated so as to suppress the rotational velocity in the set range. Accordingly, when the wind velocity fluctuates, it is possible to prevent stop of the wind turbine.

Other objects, features and advantages of the invention will become apparent from the following description of the embodiments of the invention taken in conjunction with the accompanying drawings.

DETAILED DESCRIPTION OF THE EMBODIMENTS

Description sill now be directed to embodiments of the present invention with reference to the attached drawings.

Embodiment 1

Figure 1:
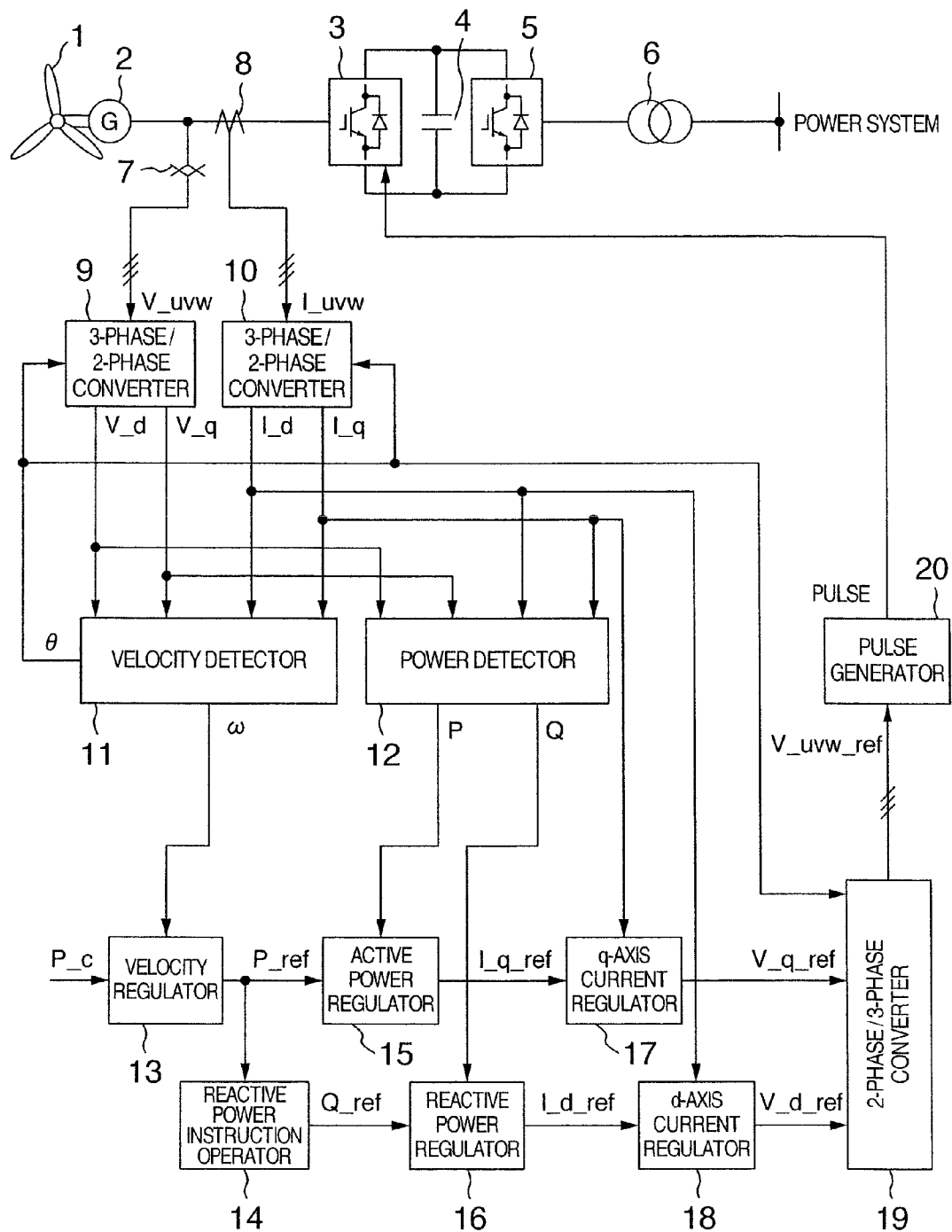
FIG. 1 is block diagram showing configuration of a wind turbine generator system using a synchronous generator according to a first embodiment of the present invention.

FIG. 1 shows the entire configuration of the present embodiment. As shown in FIG. 1, the synchronous generator 2 has a rotor connected to the shaft of the wind turbine 1. When the wind turbine 1 rotates according to the wind power based on the wind velocity, the synchronous generator 2 generates AC power of the variable frequency according to the rotational velocity of the wind turbine 1. The synchronous generator 2 has a stator connected to a converter 3. The AC power of variable frequency generated by the synchronous generator 2 is converted into DC power by the converter 3. The converter 3 is DC-connected to the converter 5 via a DC capacitor 4. The converter 5 converts the DC power fed from the converter 3 into AC power of fixed frequency. The converter 5 is connected to a power system via a system linkage transformer 6 and supplies AC power of a fixed frequency to the power system.

Between the synchronous generator 2 and the converter 3, there are arranged a voltage detection sensor 7 and a current detection sensor 8. The voltage detection sensor 7 detects terminal voltage of the stator of the synchronous generator 2 while the current detection sensor 8 detects current flowing through the stator of the synchronous generator. The voltage value detected is converted into the d-axis component V_d and q-axis component V_q by the 3-phase/2-phase converter 9 while the current value detected is converted into the d-axis component I_d and q-axis component I_q by the 3-phase/2-phase converter 10. It should be noted that in this embodiment, the d-axis component represents an reactive component and the q-axis component represents an active component.

The velocity detector 11 detects the rotational velocity ω of the wind turbine 1 and the rotor phase θ of the synchronous generator 2 according to the signals V_d, V_q, I_d, I_q outputted from the 3-phase/2-phase converters 9, 10.

The power detector 12 detects active power P and reactive power Q outputted from the synchronous generator 2, according to the signals V_d, V_q, I_d, I_q outputted from the 3-phase/2-phase converters 9, 10.

The velocity regulator 13 corrects the active power instruction P_c given to the synchronous generator 2 from outside according to the output obtained from a predetermined power curve and the wind velocity measured by the wind turbine, in accordance with the rotational velocity detection value ω detected by the velocity detector 11 and outputs the corrected active power instruction P_ref to the synchronous generator 2.

The reactive power instruction operator 14 outputs a reactive power instruction Q_ref to the synchronous generator 2 from the active power instruction P_ref to the synchronous generator 2 outputted from the velocity regulator 13. The reactive power instruction Q_ref is set so as to adjust the power factor of the synchronous generator 2.

The active power regulator 15 inputs the active power instruction P_ref outputted by the velocity regulator 13 and the active power detection value P outputted by the power detector 12 and outputs the q-axis component I_q_ref of the current instruction to the converter 3. The active power regulator 15 is formed, for example, by a proportional-integral regulator and decides the current instruction I_q_ref to the converter 3 in such a manner that difference between the active power instruction P_ref and the active power detection value P becomes zero.

The reactive power regulator 16 inputs the reactive power instruction Q_ref outputted from the reactive power instruction operator 14 and the reactive power detection value Q detected by the power detector 12 and outputs the d-axis component I_d_ref of the current instruction to the converter 3. The reactive power regulator 16 is formed, for example, by a proportional-integral regulator and decides the current instruction I_d_ref to the converter 3 in such a manner that difference between the reactive power instruction Q_ref and the reactive power detection value Q becomes zero.

The q-axis current regulator 17 inputs the q-axis component I_q of the current detection value outputted from the 3-phase/2-phase converter 10 and the q-axis component I_q_ref of the current instruction to the converter 3 and outputs the q-axis component V_q_ref of the output voltage to the converter 3. The q-axis current regulator 17 is formed, for example, by a proportional-integral regulator and decides the output voltage instruction V_q_ref to the converter 3 in such a manner that the difference between the current detection value I_q and the current instruction I_q_ref becomes zero.

The d-axis current regulator 18 inputs the d-axis component I_d of the current detection value outputted from the 3-phase/2-phase converter 10 and the d-axis component I_d_ref of the current instruction to the converter 3 and outputs the d-axis component V_d_ref of the output voltage to the converter 3. The d-axis current regulator 18 is formed, for example, by a proportional-integral regulator and decides the output voltage instruction V_d_ref to the converter 3 in such a manner that the difference between the current detection value I_d and the current instruction I_d_ref becomes zero.

The q-axis component V_q_ref and the d-axis component V_d_ref of the output voltage instruction outputted from the q-axis current regulator 17 and the d-axis current regulator 18 are converted into a 3-phase output voltage instruction V_uvw_ref by a 2-phase/3-phase converter 19.

The pulse generator 20 outputs gate pulse signals to the converter 3 by PWM (Pulse Width Modulation) according to the output voltage instruction V_uvw_ref. The converter 3 receives the gate pulse signals. The power semiconductor switching element such as IGBT and power MOSFET performs high-speed switching and the converter 3 outputs a voltage in accordance with the instruction.

Figure 2:
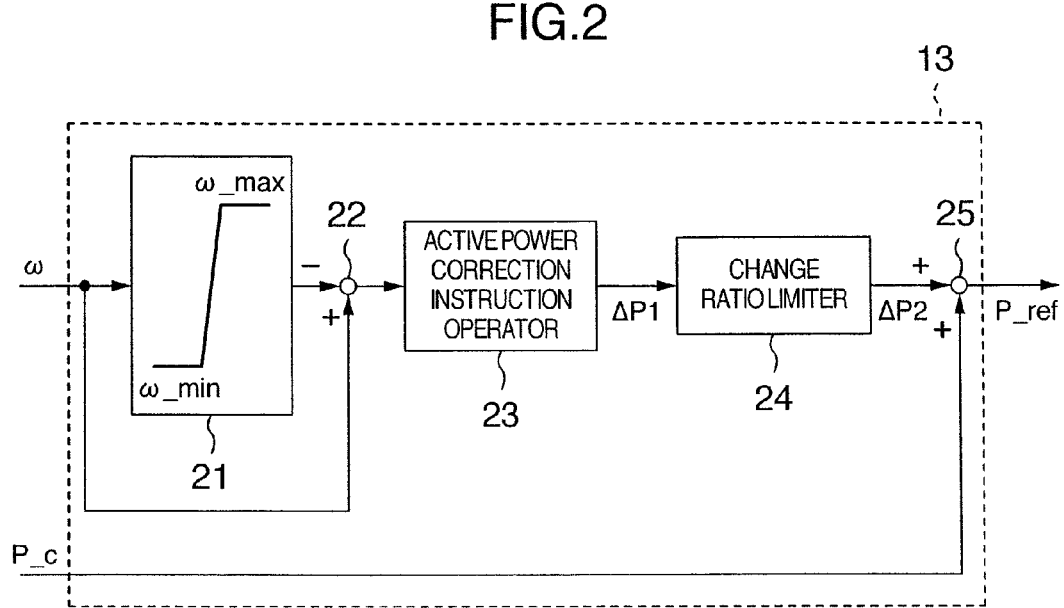
FIG. 2 is a block diagram showing configuration of a velocity regulator according to the present invention.

FIG. 2 shows detailed configuration of the velocity regulator 13. The velocity regulator 13 includes a limiter 21, a subtractor 22, an active power correction instruction operator 23, a change ratio limiter 24, and an adder 25. The limiter 21 inputs the rotational velocity detection value ω detected by the velocity detector 11. The upper limit value and the lower limit value of the limiter 21 are the upper limit value ω_max and the lower limit value ω_min of the rotational velocity of the wind turbine 1. The subtractor 22 calculates the difference between the rotational velocity detection value ω and the output of the limiter 21. According to the output of the subtractor, the active power correction instruction operator 23 calculates the active power correction instruction ΔP1. The active power correction instruction operator 23 is formed, for example, by a proportional-integral regulator. Furthermore, when its input becomes zero, the integral value is reset and the output is set to zero. The change ratio liter 24 ordinarily outputs directly the active power correction instruction ΔP1 which is outputted from the active power correction instruction operator 23 but has a function to suppress the change ratio of the output within a certain range. The output is ΔP2. The adder 25 adds the output ΔP2 of the change ratio limiter to the active power instruction P_c given from outside and outputs the active power instruction P_ref to the synchronous generator 2.

Figure 3:
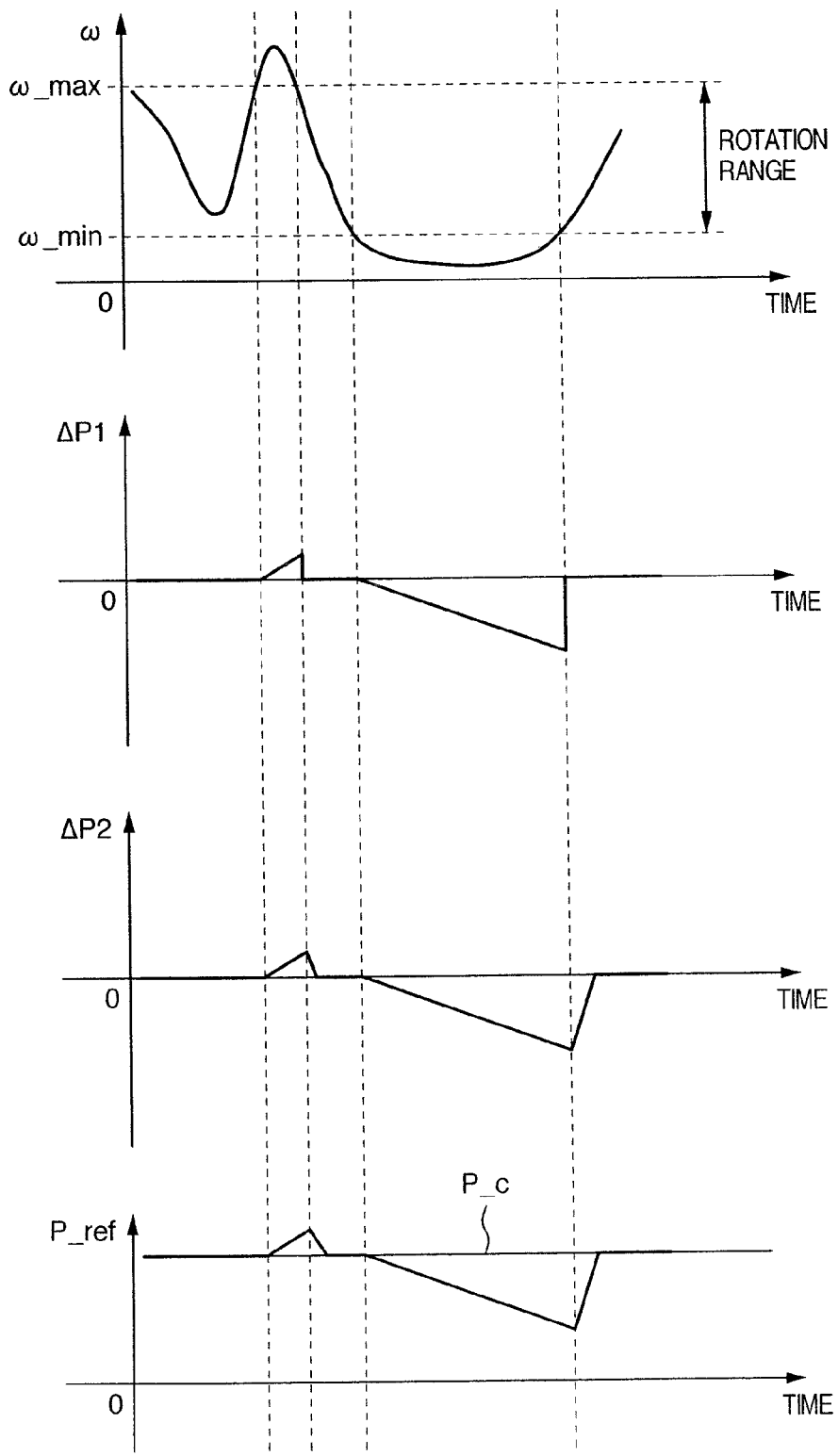
FIG. 3 shows a waveform indicating operation characteristics of the velocity regulator according to the present invention.

Next, explanation will be given on the operation of the velocity regulator 13. FIG. 3 shows an example of operation waveform of the velocity regulator 13. When the rotational velocity detection value ω detected by the velocity detector 11 is between the upper limit value ω_max and the lower limit value ω_min of the limiter 21, the output of the subtractor 22 is zero. Accordingly, the active power correction instruction ΔP1 outputted from the active power correction instruction operator 23 is reset to zero and the output ΔP2 of the change ratio limiter 24 is ordinarily zero. Consequently, the output P_ref of the adder 25 coincides with the active power instruction P_c given from outside. That is, when the rotational velocity detection value ω is between the upper limit value ω_max and the lower limit value ω_min of the rotational velocity of the wind turbine 1, the velocity regulator 13 outputs the active power instruction P_c given from outside directly as the active power instruction P_ref to the synchronous generator 2.

On the other hand, when the rotational velocity detection value ω detected by the velocity detector 11 is greater than the upper limit value ω_max of the limiter 21, the output of the subtractor 22 is positive. Accordingly, the active power correction instruction ΔP1 outputted from the active power correction instruction operator 23 increases and the output ΔP2 of the change ratio limiter 24 also increases. Consequently, the output P_ref of the adder 25 is a value greater than the active power instruction P_c given from outside. That is, when the rotational velocity detection value ω is greater than the upper limit value ω_max of the rotational velocity of the wind turbine 1, the velocity regulator 13 makes correction in the direction to increase the active power instruction P_ref to the synchronous generator 2 and this correction continues until the rotational velocity detection value ω detected by the velocity detector 11 becomes below the upper limit value ω_max of the limiter 21. When the active power outputted from the synchronous generator 2 becomes greater than the power given from the wind to the blades of the wind turbine 1, the rotational velocity of the wind turbine 1 decreases. Accordingly, when the rotational velocity detection value ω is greater than the upper limit value ω_max, correction is made in the direction to decrease the rotational velocity of the wind turbine 1.

On the contrary, when the rotational velocity detection value ω detected by the velocity detector 11 is smaller than the lower limit value ω_min of the limiter 21, the output of the subtractor 22 is negative. Accordingly, the active power correction instruction ΔP1 outputted from the active power correction instruction operator 23 decreases and the output ΔP2 of the change ratio limiter 24 also decreases. Consequently, the output P_ref of the adder 25 is a value smaller than the active power instruction P_c given from outside. That is, when the rotational velocity detection value ω is smaller than the lower limit value ω_min of the rotational velocity of the wind turbine 1, the velocity regulator 13 makes correction in the direction to decrease the active power instruction P_ref to the synchronous generator 2 and this correction continues until the rotational velocity detection value ω detected by the velocity detector 11 becomes above the lower limit value ω_min of the limiter 21. When the active power outputted from the synchronous generator 2 becomes smaller than the power given from the wind to the blades of the wind turbine 1, the rotational velocity of the wind turbine 1 increases. Accordingly, when the rotational velocity detection value ω is smaller than the lower limit value ω_min, correction is made in the direction to increase the rotational velocity of the wind turbine 1.

With the aforementioned operation of the velocity regulator 13, when the rotational velocity of the wind turbine 1 is out of a predetermined range, the velocity is regulated so as to suppress the rotational speed of the wind turbine 1 within a predetermined range, and when the rotational velocity of the wind turbine 1 is within the predetermined range, the active power control is performed according to the active power instruction given from outside. As shown in this embodiment, even when the wind velocity suddenly changes, the wind turbine can continuously operate, which improves the use ratio of the wind turbine, increases the electrical quantity generated by the wind turbine, and reduces the cost of generation by the wind turbine. Furthermore, since the wind turbine can be continuously operated, the number of operation times of a device linking the wind turbine with a system such as a contactor can be reduced, which in turn increases the service life of these devices.

Embodiment 2

Figure 4:
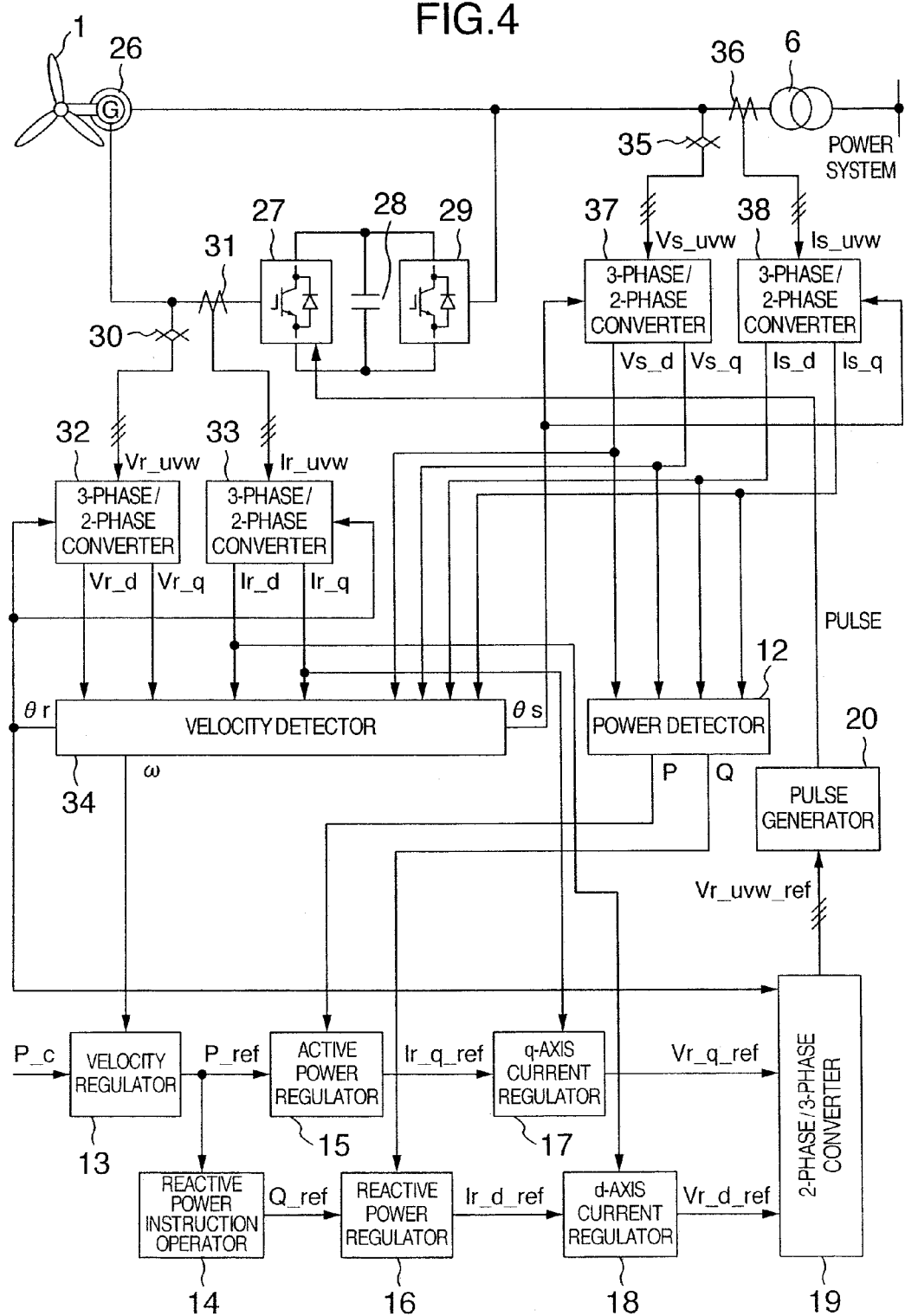
FIG. 4 is a block diagram showing configuration of a wind turbine generator system using a doubly-fed generator according to a second embodiment of the present invention.

FIG. 4 shows the entire configuration of the second embodiment using a doubly-fed generator. In FIG. 4, the rotor of the doubly-fed generator 26 is connected to the shaft of the wind turbine 1. When the wind turbine 1 rotates by the wind power in accordance with the wind velocity, the doubly-fed generator 26 connected to a power system by the stator supplies AC power matched with the system frequency to a power system. The rotor of the doubly-fed generator 26 is connected to a converter 27. The converter 27 AC-excites the rotor of the doubly-fed generator 26. The converter 27 is DC-connected to a converter 29 via a DC capacitor 28. The converter 29 supplies exciting power to the converter 27. The converter 29 is connected to the power system via a system linkage transformer 6.

Between the doubly-fed generator 26 and the converter 27, there are arranged a voltage detection sensor 30 and a current detection sensor 31. The voltage detection sensors detects a terminal voltage of the rotor of the doubly-fed generator 26 while the current detection sensor 31 detects current flowing to in the rotor of the double-fed generator 26. The voltage value detected is converted into a d-axis component Vr_d and a q-axis component Vr_q by a 3-phase/2-phase converter 32 while the current value detected is converted into a d-axis component Ir_d and a q-axis component Ir_q by a 3-phase/2-phase converter 33.

Between the doubly-fed generator 26 and the system linkage transformer 6, there are arranged a voltage detection sensor 35 and a current detection sensor 36. The voltage detection sensor 35 detects a system voltage while the current detection sensor 36 detects current flowing to the power system. The voltage value detected is converted into a d-axis component Vs_d and a q-axis component Vs_q by a 3-phase/2-phase converter 37 while the current value detected is converted into a d-axis component Is_d and a q-axis component Is_q by a 3-phase/2-phase converter 38.

According to the signals Vr_d, Vr_q, Ir_d, Ir_q, Vs_d, Vs_q, Is_d, Is_q outputted from the 3-phase/2-phase converters 32, 33, 37, 38, the velocity detector 34 detects the rotational velocity ω of the wind turbine 1, the rotor phase θr of the doubly-fed generator 26, and the system voltage phase θs.

According to the signals Vs_d, Vs_q, Is_d, Is_q outputted from the 3-phase/2-phase converters 37, 38, the voltage detector 12 detects the active power P and reactive power Q outputted from the doubly-fed generator 26.

The velocity regulator 13 uses a predetermined power curve and a wind velocity measured by the wind turbine to correct the active power instruction P_c given to the doubly-fed generator 26 from outside according to the rotational velocity detection value ω detected by the velocity detector 34 and outputs the corrected active power instruction P_ref to the doubly-fed generator 26. Here, the velocity regulator 13 has the same configuration as in the first embodiment.

The reactive power instruction operator 14 outputs the reactive power instruction Q_ref to the doubly-fed generator 26 from the active power instruction P_ref to the doubly-fed generator 26 outputted from the velocity regulator 13. The reactive power instruction Q_ref is set so as to adjust the power factor of the linkage point with the system.

The active power regulator 15 inputs the active power instruction P_ref outputted from the velocity regulator 13 and the active power detection value P detected by the power detector 12. The output of the active power regulator 15 becomes the q-axis component Ir_q_ref of the current instruction to the converter 27. The active power regulator 15 is formed, for example, by a proportional-integral regulator and decides the current instruction Ir_q_ref to the converter 27 in such a manner that the difference between the active power instruction P_ref and the active power detection value P becomes zero.

The reactive power regulator 16 inputs the reactive power instruction Q_ref outputted from the reactive power instruction operator 14 and the reactive power detection value Q detected by the power detector 12. The output of the reactive power regulator 16 becomes the d-axis component Ir_d_ref of the current instruction to the converter 27. The reactive power regulator 16 is formed, for example, by a proportional-integral regulator and decides the current instruction Ir_d_ref to the converter 27 in such a manner that the difference between the reactive power instruction Q_ref and the reactive power detection value Q becomes zero.

The q-axis current regulator 17 inputs the q-axis component Ir_q outputted from the 3-phase/2-phase converter 33 and the q-axis component Ir_q_ref of the current instruction to the converter 27. The output of the q-axis current regulator 17 becomes the q-axis component Vr_q_ref of the output voltage instruction to the converter 27. The q-axis current regulator 17 is formed, for example, by a proportional-integral regulator and decides the output voltage instruction Vr_q_ref in such a manner that the difference between the current detection value Ir_q and the current instruction Ir_q_ref becomes zero.

The d-axis current regulator 18 inputs the d-axis component Ir_d outputted from the 3-phase/2-phase converter 33 and the d-axis component Ir_d_ref of the current instruction to the converter 27. The output of the d-axis current regulator 18 becomes the d-axis component Vr_d_ref of the output voltage instruction to the converter 27. The d-axis current regulator 18 is formed, for example, by a proportional-integral regulator and decides the output voltage instruction Vr_d_ref in such a manner that the difference between the current detection value Ir_d and the current instruction Ir_d_ref becomes zero.

The q-axis component Vr_q_ref and the d-axis component Vr_d_ref of the output instructions outputted from the q-axis current regulator 17 and the d-axis current regulator 18 are converted to a 3-phase output voltage instruction Vr_uvw_ref by a 2-phase/3-phase converter 19.

According to the 3-phase output voltage instruction Vr_uvw_ref outputted from the 2-phase/3-phase converter 19, the pulse generator 20 outputs gate pulse signals to the converter 27 by PWM (Pulse Width Modulation). The converter 27 receives the gate pulse signals and outputs voltage in accordance with the instruction by the high-speed switching of the power semiconductor switching element such as the IGBT.

In this embodiment also, the velocity regulator 13 operates in the same way as the first embodiment. Accordingly, even when the doubly-fed generator is used, velocity is regulated so that the rotational velocity of the wind turbine 1 is suppressed within the set range if the rotational velocity of the wind turbine 1 exceeds the set range. When the rotational velocity of the wind turbine 1 is within the set range, the active power control is performed according to the active power instruction given from outside.

Embodiment 3

Figure 5:
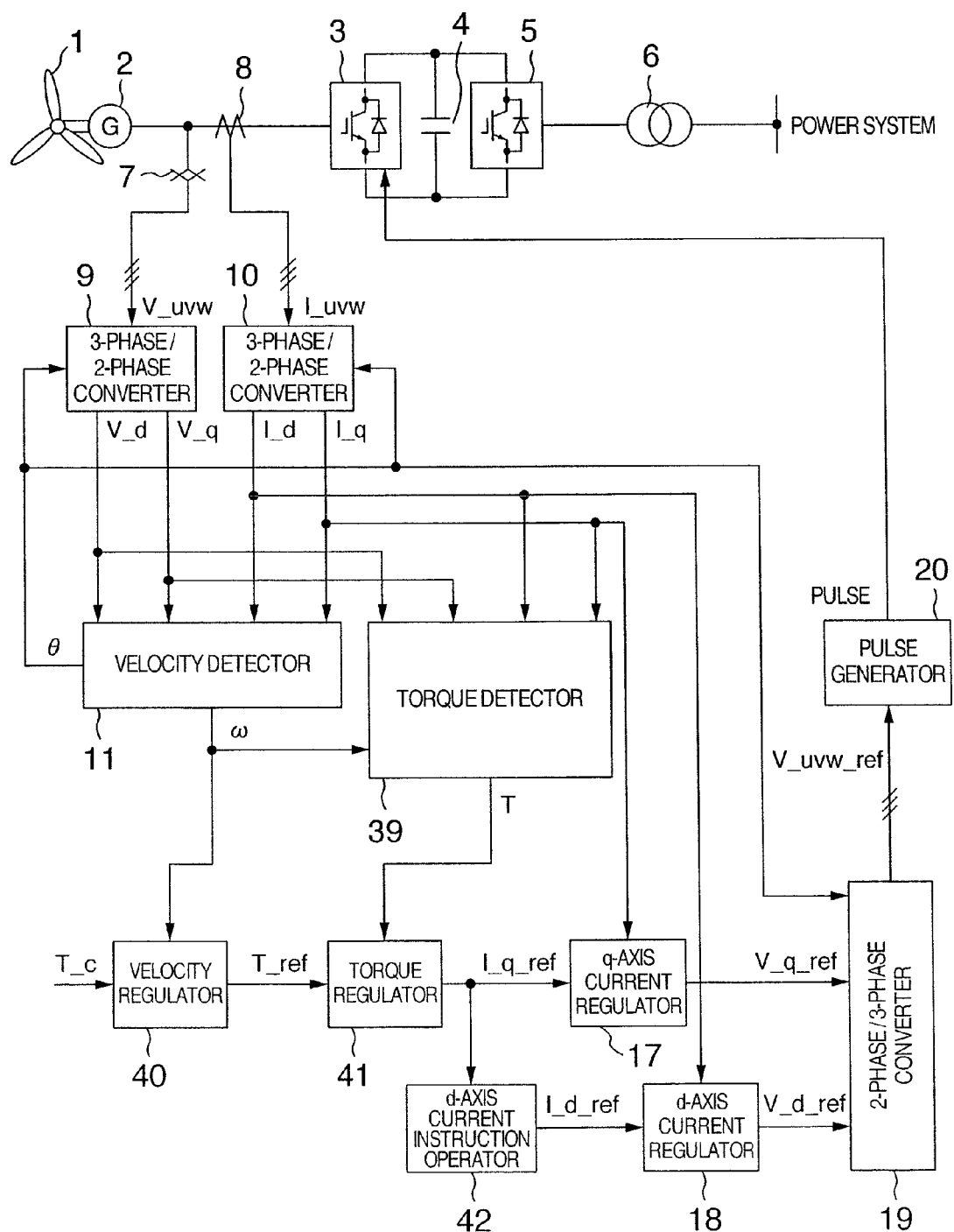
FIG. 5 is block diagram showing configuration of a wind turbine generator system using a synchronous generator according to a third embodiment of the present invention.

FIG. 5 shows the entire configuration of the wind turbine generator system according to the present embodiment. The present embodiment uses a synchronous generator and the instruction given from outside serves as a torque instruction to the generator. The torque detector 39 shown in FIG. 5 detects torque T outputted from the synchronous generator 2 according to the signals V_d, V_q, I_d, I_q outputted from the 3-phase/2-phase converters 9, 10 and the rotational velocity detection value ω detected by the velocity detector 11.

The velocity regulator 40 corrects the torque instruction T_c given to the synchronous generator 2 from outside according to the rotational velocity detection value ω detected by the velocity detector 11 and outputs the corrected torque instruction T_ref to the synchronous generator 2. The velocity regulator 40 has the same configuration as the velocity regulator 13 explained in the first and second embodiments.

The torque regulator 41 inputs the torque instruction T_ref outputted from the velocity regulator 40 and the torque detection value T detected by the torque detector 39. The output of the torque regulator 41 is formed, for example, by a proportional-integral regulator and decides the current instruction I_q_ref to the converter 3 in such a manner that the difference between the torque instruction T_ref and the torque detection value T becomes zero.

The d-axis current instruction operator 42 inputs the q-axis component I_q_ref of the current instruction outputted from the torque regulator 41 and the d-axis current instruction operator 42 outputs the d-axis component I_d_ref of the current instruction to the converter 3. The d-axis component I_d_ref of the current instruction is set so as to adjust the power factor of the synchronous generator 2.

The other configuration of the wind turbine generator system according to the present embodiment shown in FIG. 5 is similar to the configuration of FIG. 1. Even when the instruction given from outside is the torque instruction to the generator, velocity is regulated so as to suppress the rotational velocity of the wind turbine 1 within the set range if the rotational velocity of the wind turbine 1 exceeds the set range. When the rotation speed of the wind turbine 1 is within the set range, torque regulation is performed according to the torque instruction given from outside.

Embodiment 4

Figure 6:
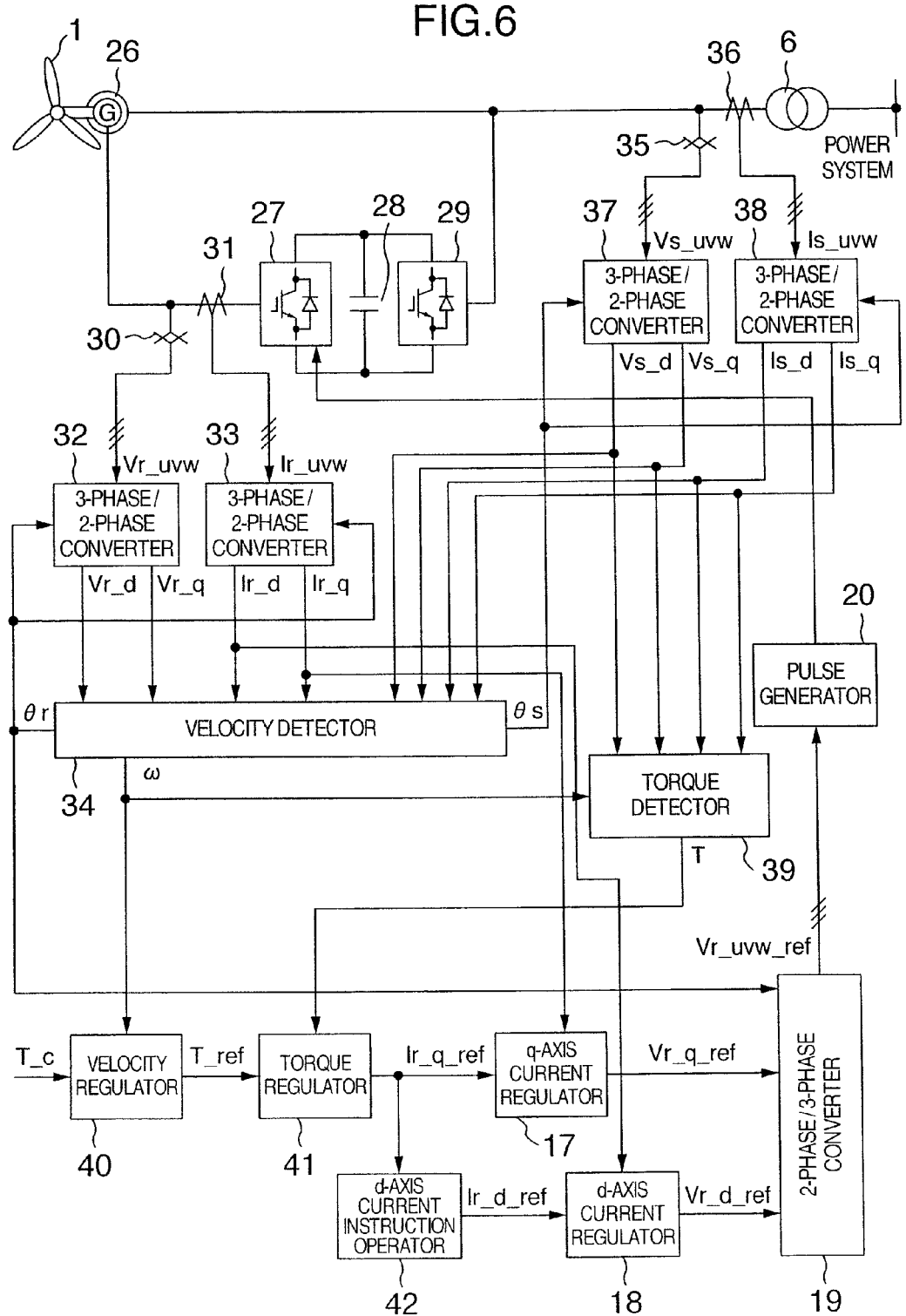
FIG. 6 is a block diagram showing configuration of a wind turbine generator system using a doubly-fed generator according to a fourth embodiment of the present invention.

FIG. 6 shows the entire configuration of the wind turbine generator system according to the present embodiment. The present embodiment uses a doubly-fed generator and the instruction given from outside serves as a torque instruction to the generator. The torque detector 39 shown in FIG. 6 detects torque T outputted from the doubly-fed generator 26 according to the signals Vs_d, Vs_q, Is_d, Is_q outputted from the 3-phase/2-phase converters 37, 38 and the rotational velocity detection value ω detected by the velocity detector 34.

The velocity regulator 40 corrects the torque instruction T_c given to the doubly-fed generator 26 from outside, according to the rotational velocity detection value ω detected by the velocity detector 34 and outputs the corrected torque instruction T_ref to the doubly-fed generator 26. The velocity regulator 40 may be configured in a similar way to the velocity regulator 13 explained in the first and second embodiments.

The torque regulator 41 inputs the torque instruction T_ref outputted from the velocity regulator 40 and the torque detection value T detected by the torque detector 39. The output of the torque regulator 41 is the q-axis component Ir_q_ref of the current instruction to the converter 27. The torque regulator 41 is formed, for example, by a proportional-integral regulator and decides the current instruction Ir_q_ref to the convert 27 in such a manner that the difference between the torque instruction T_ref and the torque detection value T becomes zero.

The d-axis current instruction operator 42 inputs the q-axis component Ir_q_ref of the current instruction outputted from the torque regulator 41 and the output of the d-axis current instruction operator 42 is the d-axis component Ir_d_ref of the current instruction to the converter 27. The d-axis component Ir_d_ref of the current instruction is set so as to adjust the power factor of the linkage point with the system.

The other configuration of the wind turbine generator system according to the present embodiment shown in FIG. 6 is similar to the configuration shown in FIG. 4. Even when the instruction given from outside is the torque instruction to the generator, velocity is regulated so as to suppress the rotation speed of the wind turbine 1 within a set range if the rotational velocity of the wind turbine 1 exceeds the set range. When the rotational velocity of the wind turbine 1 is within the set range, torque regulation is performed according to the torque instruction given from outside.

Embodiment 5

Figure 7:
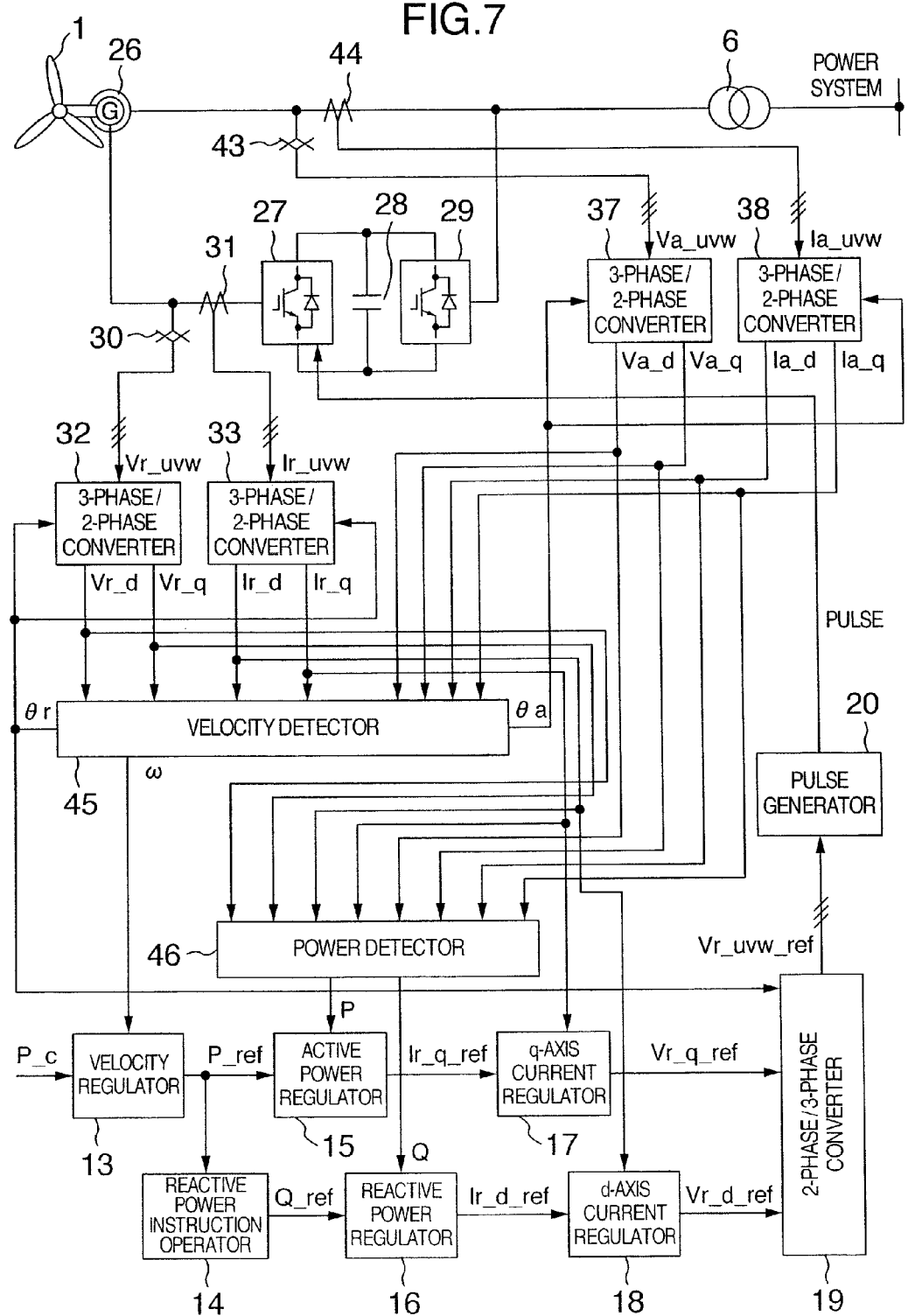
FIG. 7 is a block diagram showing configuration of a wind turbine generator system using a doubly-fed generator according to a fifth embodiment of the present invention.

FIG. 7 shows the entire configuration of the wind turbine generator system according to the present embodiment. The present embodiment employs a doubly-fed generator and the instruction given from outside is the active power instruction to the generator. As shown in FIG. 7, the arrangement of the voltage detection sensor 43 and the current detection sensor 44 is different from the second embodiment shown in FIG. 2. The other configuration is similar to that of the second embodiment. In the embodiment shown in FIG. 7 also, when the rotational velocity of the wind turbine 1 exceeds the set range, velocity regulation is performed so as to suppress the rotational velocity of the wind turbine 1 to a set range. When the rotational velocity of the wind turbine 1 is within the set range, the active power regulation is performed according to the active power instruction given from outside.

Embodiment 6

Figure 8:
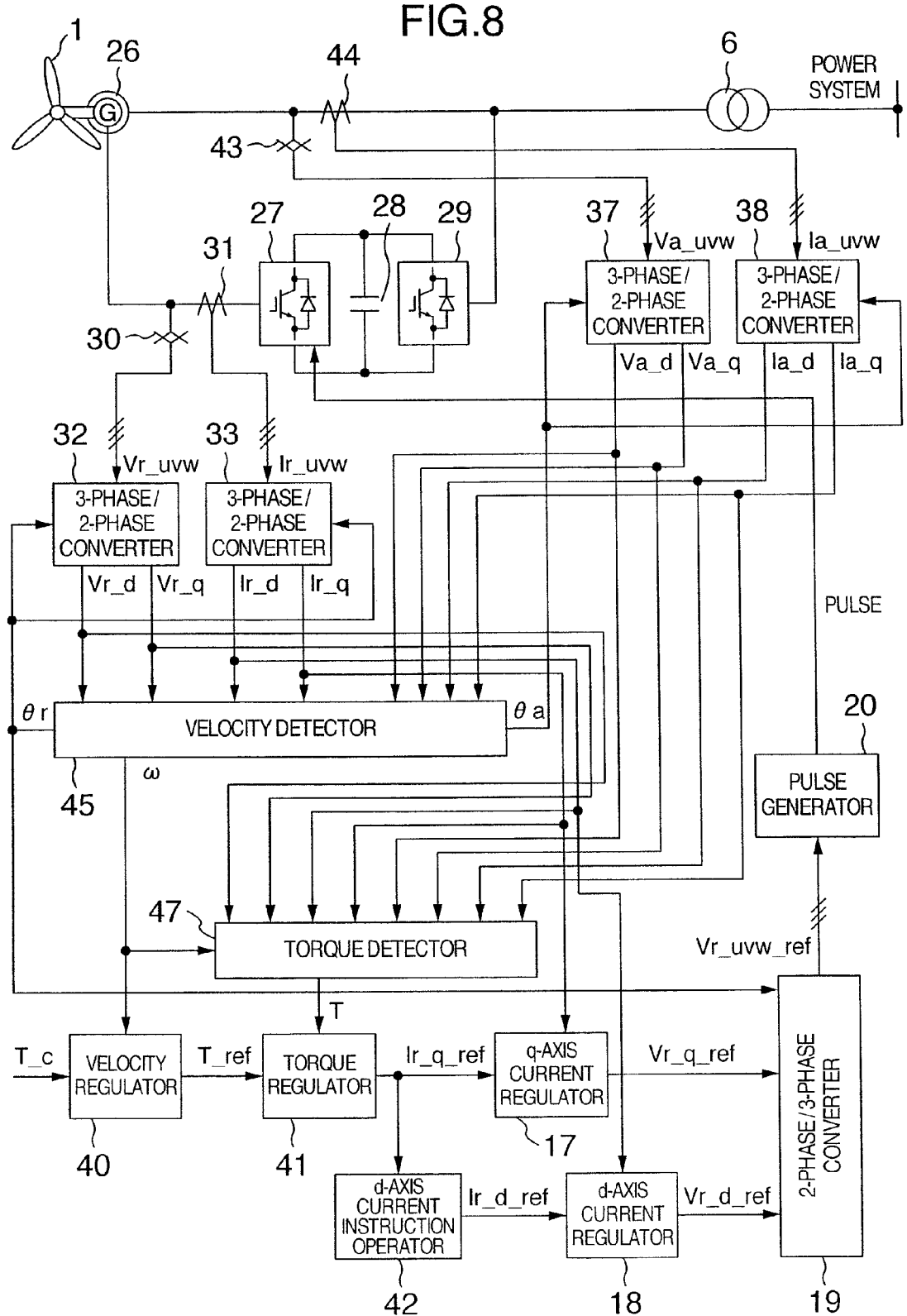
FIG. 8 is a block diagram showing configuration of a wind turbine generator system using a doubly-fed generator according to a sixth embodiment of the present invention.

FIG. 8 shows the entire configuration of the wind turbine generator system according to the present embodiment. The present embodiment employs a doubly-fed generator and the instruction given from outside is the torque instruction. This embodiment shown in FIG. 8 is similar to the fourth embodiment except for that the arrangement of the voltage detection sensor 43 and the current detection sensor 44 is different from the fourth embodiment shown in FIG. 6. In the embodiment shown in FIG. 8 also, when the rotational velocity of the wind turbine 1 exceeds a set range, velocity regulation is performed so as to suppress the rotational velocity of the wind turbine 1 to the set range. When the rotational velocity of the wind turbine 1 is in the set range, the torque regulation is performed according to the torque instruction given from outside.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wind turbine generator system of variable velocity drive comprising a generator connected to a shaft of a wind turbine, a converter connected to the generator, and a regulator for the converter,
    wherein when the rotational velocity of the wind turbine is within a predetermined range, the regulator performs control so that the power outputted from the generator follows an instruction concerning the generator output given from the wind turbine to the converter, and when the rotational velocity of the wind turbine is out of the predetermined range, the power outputted from the generator is controlled without following the instruction concerning the generator output.

2. The wind turbine generator system as claimed in claim 1, wherein the instruction concerning the generator output is a value obtained by multiplying the instruction concerning generator torque given from the wind turbine to the converter, by the rotational velocity of the wind turbine.

3. The wind turbine generator system as claimed in claim 1, wherein the instruction concerning the generator output is an output obtained from a power curve predetermined in the wind turbine and the wind velocity measured by the wind turbine.

4. A wind turbine generator system of variable velocity drive comprising a generator connected to a shaft of a wind turbine, a converter connected to the generator, and a regulator for the converter,
    wherein the regulator has a first control mode for controlling the power outputted by the generator according to the instruction concerning the generator output given from the wind turbine to the converter and a second control mode for controlling the rotational velocity of the wind turbine and the two control modes are switched from one to the other according to the rotational velocity of the wind turbine.

5. The wind turbine generator system as claimed in claim 4, wherein the regulator includes correction means for correcting the instruction concerning the generator output according to the rotational velocity of the wind turbine and controls power of the generator by the power instruction outputted from the correction means, thereby controlling the rotational velocity of the wind turbine.

6. The wind turbine generator system as claimed in claim 4, wherein the instruction concerning the generator output of the first control mode is an instruction concerning torque of the generator given from the wind turbine to the converter and instead of the power outputted from the generator, the torque outputted from the generator is controlled.

7. The wind turbine generator system as claimed in claim 6, wherein the regulator includes correction means for correcting the instruction concerning the generator torque according to the rotational velocity of the wind turbine and regulates torque of the generator by the torque instruction outputted from the correction means, thereby regulating the rotational velocity of the wind turbine.

8. A wind turbine generator system of variable velocity drive comprising a wind turbine, a synchronous generator connected to a shaft of the wind turbine, a first converter connected to a stator winding of the synchronous generator, a regulator for the first converter, and a second converter connected to a DC side of the first converter and a power system,
  wherein AC power of variable frequency outputted from the synchronous generator is converted into DC power by the first converter and the DC power is converted into AC power of fixed frequency by the second converter for output,
  the regulator includes a velocity detector for detecting the rotational velocity of the wind turbine, a velocity regulator for inputting a velocity detection value outputted from the velocity detector, a power detector for detecting power outputted from the synchronous generator, and an active power regulator for inputting an active power detection value outputted from the power detector, and
  when the velocity detection value is within a predetermined range, the velocity regulator outputs an instruction concerning the generator output as an active power instruction to the active power regulator, and when the velocity detection value is out of the predetermined range, the velocity regulator corrects the instruction concerning the generator output according to the velocity detection value and outputs the corrected instruction as an active power instruction to the active power regulator.

9. The wind turbine generator system as claimed in claim 8, wherein the regulator includes a torque detector for detecting torque outputted from the synchronous generator instead of the power detector and a torque regulator for inputting a torque detection value outputted from the torque detector instead of the active power regulator, and
  when the velocity detection value is within a predetermined range, the velocity regulator outputs an instruction concerning the generator torque as a torque instruction to the torque regulator, and when the velocity detection value is out of the predetermined range, the velocity regulator corrects the instruction concerning the generator torque according to the velocity detection value and outputs the corrected instruction as a torque instruction to the torque regulator.

10. A wind turbine generator system of variable velocity drive comprising a wind turbine, a doubly-fed generator having a rotor connected to a shaft of the wind turbine, a first converter connected to a rotor winding of the doubly-fed generator, a regulator for the first converter, and a second converter connected to a DC side of the first converter and a power system,
  wherein the first converter AC excites the rotor winding of the doubly-fed generator and the stator winding of the doubly-fed generator is connected to the power system and outputs AC power of fixed frequency,
  the regulator includes a velocity detector for detecting the rotational velocity of the wind turbine, a velocity regulator for inputting a velocity detection value outputted from the velocity detector, a power detector for detecting the power outputted from the doubly-fed generator, and an active power regulator for inputting an active power detection value outputted from the power detector, and
  when the velocity detection value is within a predetermined range, the velocity regulator outputs an instruction concerning the generator output as an active power instruction to the active power regulator, and when the velocity detection value is out of the predetermined range, the velocity regulator corrects the instruction concerning the generator output according to the velocity detection value and outputs the corrected instruction as an active power instruction to the active power regulator.

11. The wind turbine generator system as claimed in claimed 10, wherein the regulator includes a torque detector for detecting torque outputted from the doubly-fed generator instead of the power detector and a torque regulator for inputting a torque detection value outputted from the torque detector instead of the active power regulator, and
  when the velocity detection value is within a predetermined range, the velocity regulator outputs an instruction concerning the generator torque as a torque instruction to the torque regulator, and when the velocity detection value is out of the predetermined range, the velocity regulator corrects the instruction concerning the generator torque according to the velocity detection value and outputs the corrected instruction as a torque instruction to the torque regulator.

12. A wind turbine generator system of variable velocity drive comprising a generator connected to a shaft of a wind turbine, a converter connected to the generator, and a regulator for the converter,
  wherein when the rotational velocity of the wind turbine is within a predetermined range, the regulator performs control so that the power outputted from the generator follows an instruction concerning the generator output given from the wind turbine to the converter.

13. A control method of a wind turbine generator system of variable velocity drive comprising a generator connected to a shaft of a wind turbine, a converter connected to a generator, and a regulator for the converter,
  wherein when the rotational velocity of the wind turbine is out of the predetermined range, the power outputted from the generator is controlled without following the instruction concerning the generator output.

* * * * *